US012578688B2

(12) United States Patent
Raman et al.

(10) Patent No.: US 12,578,688 B2
(45) Date of Patent: Mar. 17, 2026

(54) CHIP-SCALE ATOMIC BEAM GENERATING SYSTEMS

(71) Applicants: Georgia Tech Research Corporation, Atlanta, GA (US); National Institute of Standards and Technology, Boulder, CO (US)

(72) Inventors: Chandra Raman, Decatur, GA (US); Elizabeth Donley, Boulder, CO (US); John Kitching, Boulder, CO (US); Chao Li, Atlanta, GA (US); Gabriela Martinez, Boulder, CO (US); William McGehee, Boulder, CO (US)

(73) Assignees: Georgia Tech Research Corporation, Atlanta, GA (US); National Institute of Standards and Technology, Gaithersburg, MD (US)

( * ) Notice: Subject to any disclaimer, the term of this patent is extended or adjusted under 35 U.S.C. 154(b) by 0 days.

(21) Appl. No.: 18/832,716

(22) PCT Filed: Jan. 24, 2023

(86) PCT No.: PCT/US2023/061143
§ 371 (c)(1),
(2) Date: Jul. 24, 2024

(87) PCT Pub. No.: WO2024/050153
PCT Pub. Date: Mar. 7, 2024

(65) Prior Publication Data

US 2025/0103010 A1 Mar. 27, 2025

Related U.S. Application Data

(60) Provisional application No. 63/302,308, filed on Jan. 24, 2022.

(51) Int. Cl.
*G04F 5/14* (2006.01)
*G21K 1/02* (2006.01)

(52) U.S. Cl.
CPC ................. *G04F 5/14* (2013.01); *G21K 1/02* (2013.01)

(58) Field of Classification Search
CPC .. G04F 5/14; G04F 5/145; G21K 1/02; G21K 1/025; G21K 1/006; H05H 3/00; H05H 3/02
See application file for complete search history.

(56) References Cited

U.S. PATENT DOCUMENTS 9,117,563 B2 8/2015 Hughes et al.
11,205,524 B2 12/2021 Raman et al.
(Continued)

FOREIGN PATENT DOCUMENTS

WO WO-2019222594 A1 * 11/2019 ............... G21K 1/02

OTHER PUBLICATIONS

International Search Report and Written Opinion from Application No. PCT/US2023/061143 dated Mar. 5, 2024.
(Continued)

*Primary Examiner* — Ryan Johnson
(74) *Attorney, Agent, or Firm* — TROUTMAN PEPPER LOCKE LLP; Ryan A. Schneider; Dustin B. Weeks

(57) ABSTRACT

An exemplary embodiment of the present disclosure provides a chip-scale atomic beam system comprising an atomic vapor source, a plurality of channels, and a propagation chamber. The atomic vapor source chamber can comprise an atomic vapor source configured to emit an atomic vapor. The plurality of channels can have first ends and second ends. The first ends can be in fluid communication with the atomic vapor source chamber. The plurality of channels can be configured to collimate the atomic vapor as it moves through the plurality of channels from the first
(Continued)

ends to the second ends. The propagation chamber can be in fluid communication with the second ends of the plurality of channels. The propagation chamber can have an internal pressure less than an internal pressure of the atomic vapor source chamber to enable the collimated atomic vapor to propagate through the propagation chamber.

15 Claims, 3 Drawing Sheets

(56) References Cited

U.S. PATENT DOCUMENTS

| | | | | |
|---|---|---|---|---|
| 2009/0309668 | A1* | 12/2009 | Bulatowicz | G04F 5/14 331/3 |
| 2013/0048882 | A1 | 2/2013 | Yoshitake et al. | |
| 2018/0210403 | A1* | 7/2018 | Maurice | H03L 7/26 |

OTHER PUBLICATIONS

Hasegawa M. et al.: "Paper; Effects of Getters on Hermetically Sealed Micromachined Ceium Neon Cells for Atomic Clocks;Effects of Getters on Hermerically Seal Micromachined Cesium—Neon Vells for Atomic Clocks", Journal of Microsmechanics and Microsengineering, Institute of Physics Publishing, Bristol, GB, vol. 23, No. 5, Apr. 18, 2013 (Apr. 18, 2013), p. 55022, XP20244253, ISSN: 0960-1317, DOI: 10.1088/0960-1317/23/5/055022. (7 pages).

Jin Y.F., et al.: "An Investigation on NEG Thick Film for Vacci, Packaging on MEMS", Jan. 1, 2003, vol. 4980, Jan. 1, 2003 (Jan. 1, 2003), pp. 275-280, XP002341635, DOI: 10.1117/12.472716. (6 pages).

Straessle R., et al.: "Microfabricated Alkali Vapor Cell with Anti-Relaxation Wall Coating", Applied Physics Letters, American Institute of Physics, 2 Huntington Quadranglw, Melville, NY 11747, vol. 105, No. 4, Jul. 28, 2014 (Jul. 28, 2014), XP012189254, ISSN: 0003-6951, DOI: 10.1063/14891248 [Retrieved on Jan. 1, 1901]. (5 pages).

Maurice V., et al.: "Microfabricated Vapor Cells Filled with a Cesium Dispensing Pate for Miniature Atomic Clocks", Applied Physics Letters, American Institute of Physics, 2 Huntingdon Quadrangle, Melville, NY 11747, vol. 110, No. 16, Apr. 19, 2017 (Apr. 19, 2017) XP012218213, ISSN: 0003-6951, DOI: 10.1063/1.4981772 [Retrieved on Apr. 19, 2017]. (5 Pages).

Extended European Search Report dated Dec. 1, 2025 issued in related European Application No. 23861394.7. (9 Pages).

* cited by examiner

CHIP-SCALE ATOMIC BEAM GENERATING SYSTEMS

CROSS-REFERENCE TO RELATED APPLICATIONS

This application claims the benefit of U.S. Provisional Application Ser. No. 63/302,308, filed on 24 Jan. 2022 which is incorporated herein by reference in its entirety as if fully set forth below.

FEDERALLY SPONSORED RESEARCH OR DEVELOPMENT

This invention was made with government support under N00014-20-1-2429 awarded by the Office of Naval Research. The government has certain rights in the invention.

FIELD OF THE DISCLOSURE

The various embodiments of the present disclosure relate generally to atomic beam generating systems and methods.

BACKGROUND

Systems for generating atomic beams are a longstanding technology for atom-based sensors and clocks. Conventional atomic beam generating systems, such as Cs beam tubes for atomic clocks, exist either in lab-scale vacuum systems or in custom vacuum tubes. Such Cs beam atomic clocks are broadly used in telecommunication systems. However, these conventional systems are often too large for certain applications and rely on complex manufacturing techniques. Accordingly, there is a need for improved systems for generating atomic beams that that are more manufacturable and/or more compact that conventional systems. Embodiments disclosed herein provide such systems.

BRIEF SUMMARY

An exemplary embodiment of the present disclosure provides a chip-scale atomic beam system comprising an atomic vapor source, a plurality of channels, and a propagation chamber. The atomic vapor source chamber can comprise an atomic vapor source configured to emit an atomic vapor. The plurality of channels can have first ends and second ends. The first ends can be in fluid communication with the atomic vapor source chamber. The plurality of channels can be configured to collimate the atomic vapor as it moves through the plurality of channels from the first ends to the second ends. The propagation chamber can be in fluid communication with the second ends of the plurality of channels. The propagation chamber can have an internal pressure less than an internal pressure of the atomic vapor source chamber to enable the collimated atomic vapor to propagate through the propagation chamber.

In any of the embodiments disclosed herein, the system can further comprise one or more passive pumps configured to cause the internal pressure of the propagation chamber to be less than the internal pressure of the atomic vapor source chamber.

In any of the embodiments disclosed herein, the one or more passive pumps can comprise one or more non-evaporable getter pumps.

In any of the embodiments disclosed herein, the one or more passive pumps can comprise graphite.

In any of the embodiments disclosed herein, the atomic vapor source can comprise alkali atoms, alkali earth atoms, or molecules thereof.

In any of the embodiments disclosed herein, the atomic vapor source can comprise Rubidium.

In any of the embodiments disclosed herein, the atomic vapor source can be configured to emit the atomic vapor when thermally or optically stimulated.

In any of the embodiments disclosed herein, the system can comprise a stack of one or more layers bonded together.

In any of the embodiments disclosed herein, the stack can comprise at least one silicon layer bonded to at least one glass layer.

In any of the embodiments disclosed herein, the plurality of channels can be formed into the at least one silicon layer.

In any of the embodiments disclosed herein, the one or more layers can be bonded by anodic or fusion bonding.

In any of the embodiments disclosed herein, a top layer and a bottom layer of the one or more layers can be transparent.

In any of the embodiments disclosed herein, the plurality of channels can have an aspect ratio of between 1:1 and 1:100,000.

In any of the embodiments disclosed herein, an internal volume comprising the atomic vapor source chamber, the plurality of channels, and the propagation chamber can be hermetically sealed.

In any of the embodiments disclosed herein, the system can be configured as an atomic clock.

In any of the embodiments disclosed herein, the system can be configured as an atom interferometer.

In any of the embodiments disclosed herein, the plurality of channels can have an orientation configured to generate a desired atomic flux.

In any of the embodiments disclosed herein, the plurality of channels can be parallel to each other.

Another embodiment of the present disclosure provides a chip-scale atomic beam system, comprising a first chamber, a second chamber, and a plurality of channels. The first chamber can have an internal volume comprising an atomic vapor source. The first chamber can have a first internal pressure. The second chamber can have an internal volume. The second chamber can have a second internal pressure less than the first internal pressure creating a pressure differential between the first and second chambers. The plurality of channels can have first ends and second ends. The first ends can be in fluid communication with the first chamber The second ends can be in fluid communication with the second chamber.

In any of the embodiments disclosed herein, the pressure differential between the first and second chambers can cause an atomic vapor emitted by the atomic vapor source to travel from the first chamber, through the plurality of channels, and to the second chamber.

In any of the embodiments disclosed herein, the system cam further comprise one or more passive pumps configured to, at least in part, induce the pressure differential between the first and second chambers.

In any of the embodiments disclosed herein, the first chamber, plurality of channels, and second chamber can be formed, at least in part, from a stack of one or more layers bonded together.

In any of the embodiments disclosed herein, the internal volume of the first and second chambers and the plurality of channels can be hermetically sealed.

These and other aspects of the present disclosure are described in the Detailed Description below and the accompanying drawings. Other aspects and features of embodiments will become apparent to those of ordinary skill in the art upon reviewing the following description of specific, exemplary embodiments in concert with the drawings. While features of the present disclosure may be discussed relative to certain embodiments and figures, all embodiments of the present disclosure can include one or more of the features discussed herein. Further, while one or more embodiments may be discussed as having certain advantageous features, one or more of such features may also be used with the various embodiments discussed herein. In similar fashion, while exemplary embodiments may be discussed below as device, system, or method embodiments, it is to be understood that such exemplary embodiments can be implemented in various devices, systems, and methods of the present disclosure.

BRIEF DESCRIPTION OF THE DRAWINGS

The following detailed description of specific embodiments of the disclosure will be better understood when read in conjunction with the appended drawings. For the purpose of illustrating the disclosure, specific embodiments are shown in the drawings. It should be understood, however, that the disclosure is not limited to the precise arrangements and instrumentalities of the embodiments shown in the drawings.

DETAILED DESCRIPTION

To facilitate an understanding of the principles and features of the present disclosure, various illustrative embodiments are explained below. The components, steps, and materials described hereinafter as making up various elements of the embodiments disclosed herein are intended to be illustrative and not restrictive. Many suitable components, steps, and materials that would perform the same or similar functions as the components, steps, and materials described herein are intended to be embraced within the scope of the disclosure. Such other components, steps, and materials not described herein can include, but are not limited to, similar components or steps that are developed after development of the embodiments disclosed herein.

Figure 1:
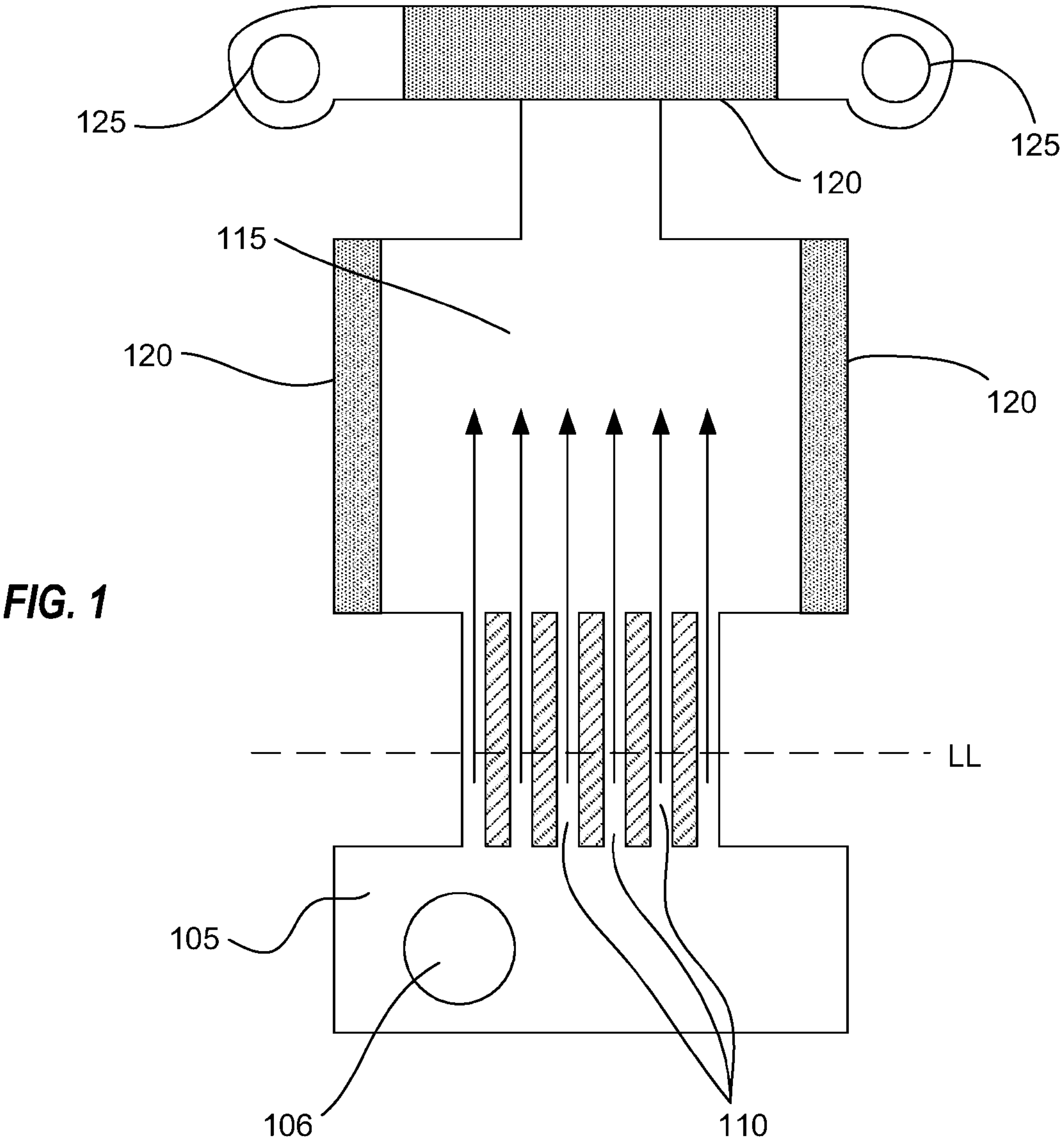
FIG. 1 provides a schematic of a chip-scale atomic beam system, in accordance with an exemplary embodiment of the present disclosure.

As shown in FIG. 1, an exemplary embodiment of the present disclosure provides a chip-scale atomic beam system comprising an atomic vapor source 106, a plurality of channels 110, and a propagation chamber 115. The atomic vapor source chamber 105 can comprise an atomic vapor source 106 configured to emit an atomic vapor. The atomic vapor source 106 can be configured to emit the atomic vapor when thermally and/or optically stimulated. The atomic vapor source 106 can be any elemental metal or chemical compounds that output atomic vapor, for example, when thermally or optically stimulated. In some embodiments of the present disclosure, the atomic vapor source 106 comprises comprise alkali atoms, alkali earth atoms, or molecules thereof. In some embodiments, the atomic vapor source 106 can comprise Rubidium, such as a Rubidium pill.

The plurality of channels 110 can have first ends and second ends. The first ends can be in fluid communication with the atomic vapor source chamber 105. The plurality of channels 110 can be configured to collimate the atomic vapor as it moves through the plurality of channels from the first ends to the second ends. The plurality of channels 110 can have an aspect ratio that ranges between 1:1 and 1:100,000. The plurality of channels 110 can have an orientation configured to generate a desired atomic flux. In some embodiments, the plurality of channels 110 can be substantially parallel to each other, as shown in FIG. 1.

Figure 3:
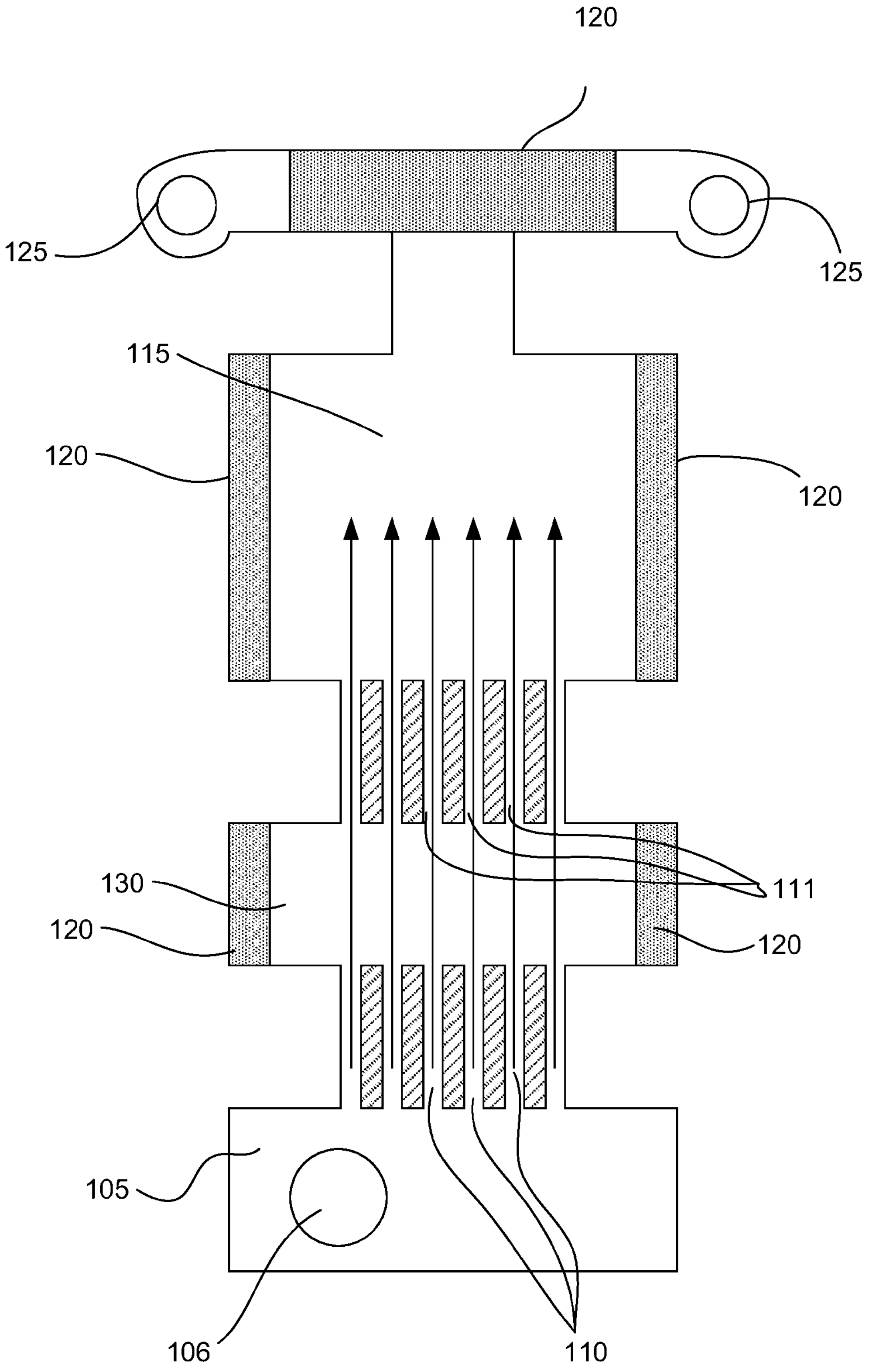
FIG. 3 provides a schematic of a chip-scale atomic beam system, in accordance with an exemplary embodiment of the present disclosure.

As shown in FIG. 3, in some embodiments, the system can comprise two or more cascaded set of channels 110 111. The sets of channels 110 111 can be separated by an additional chamber 130. Thus, the atomic vapor generated by the atomic vapor source 106 in the atomic vapor source chamber 105 can flow through the first set of channels 110, through the additional chamber 130, through the second set of channels 111, and to the propagation chamber 115. The multiple sets of channels 110 111 can allow the atomic vapor to be more collimated when reaching the propagation chamber. The flow of the atomic vapor is represented by the arrows shown in FIGS. 1 and 3.

The propagation chamber 115 can be in fluid communication with the second ends of the plurality of channels 110. Accordingly, atomic vapors generated by the atomic vapor source 106 in the atomic vapor source chamber 105 can propagate from the atomic vapor source chamber 105, through the plurality of channels 110 during which the atomic vapor can be collimated, and to the propagation chamber 115.

The flow of atomic vapor can be induced by a pressure differential between the atomic vapor source chamber 105 and the propagation chamber 115. In particular, the propagation chamber can have an internal pressure less than an internal pressure of the atomic vapor source chamber 105 to enable the collimated atomic vapor to propagate through the propagation chamber 115. The pressure differential can be induced by one or more pumps to remove residual gases and maintain a vacuum. The pumps can be passive pumps configured to cause the internal pressure of the propagation chamber to be less than the internal pressure of the atomic vapor source chamber 105. In some embodiments, the pumps can be passive pumps, including but not limited to non-evaporable getter pumps 125, graphite 120, and combinations thereof. As shown in the FIG. 1, the one or more pumps can comprise non-evaporable getter pumps 125 and graphite rods 120. As shown in FIG. 3, when the additional chamber 130 is used, the additional chamber can also comprise pumps, such as graphite rods 120.

The pressure differential between the propagation chamber 115 and the atomic vapor source chamber 105 can also be maintained in part by hermetically sealing the device. For example, in some embodiment, an internal volume comprising the atomic vapor source chamber 105, the plurality of channels 110, and the propagation chamber 115 can be hermetically sealed to create a vacuum.

Figure 2:
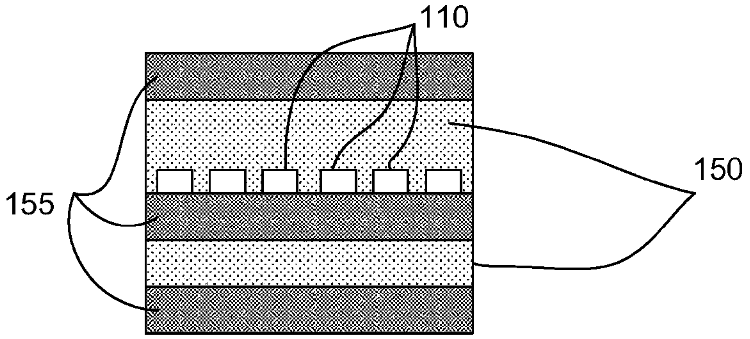
FIG. 2 provides a schematic of a cross-sectional view of the chip-scale atomic beam system in FIG. 1 across the line LL, in accordance with an exemplary embodiment of the present disclosure.

FIG. 2 shows a cross sectional view along the line LL in FIG. 1. As shown in FIG. 2, a portion of the atomic beam system can comprise a stack of one or more layers 150 155 bonded together. The layers 150 155 can be many different materials known in the art. In some embodiments, the stack can comprise at least one silicon layer 150 bonded to at least one glass layer 155. In some embodiments, as shown in FIG. 2, the stack can comprise multiple layers of silicon 150 and glass 155 bonded together. The one or more layers 150 155 can be bonded together. Many different bonding techniques can be employed, including, but not limited to, anodic bonding, fusion bonding, and the like.

In some embodiments, the plurality of channels 110 can be formed into at least one silicon layer 150 in the stack, as shown in FIG. 2. The plurality of channels 110 can be formed many different ways, including etching, machining, and the like. In some embodiments, as shown in FIG. 2, the plurality of channels 110 can be substantially coplanar within the silicon layer 150. The disclosure is not so limited, however. Rather, in some embodiments, the plurality of channels 110 can be non-coplanar. For example, the adjacent channels can be vertically offset from each other. In some embodiments, the plurality of channels 110 can be formed from multiple rows of channels within the same layer or within different layers in the stack.

In some embodiments, a top layer and/or a bottom layer of the one or more layers can be transparent, such as a transparent glass. The top and/or bottom layers can be made of a material that allows the atomic beam to be interrogated in the propagation chamber 115. Interrogation of the beam in the propagation chamber 115 can be performed, for example, using external electromagnetic fields.

Figure 4:
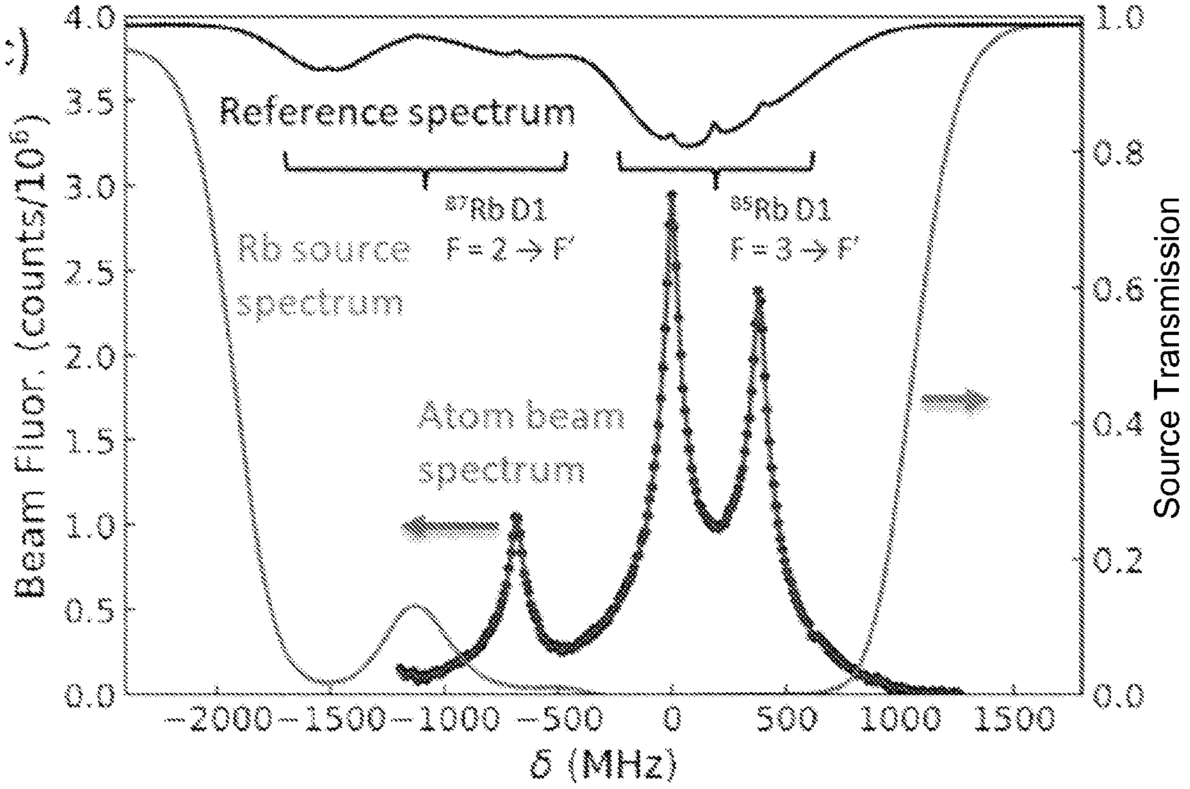
FIG. 4 provides a plot of Rb fluorescence spectrum measuring the transverse velocity distribution of the atomic beam generated by a chip-scale atomic beam system and Rb absorption spectrum measuring the Rb vapor density feeding the channel array, in accordance with an exemplary embodiment of the present disclosure. A saturated absorption spectrum from a natural abundance Rb cell is included for reference.

As shown in FIG. 4, initial characterization was performed on an exemplary atomic beam system using absorption spectroscopy, which shows that a beam is formed and that the system maintains a level of vacuum.

The atomic beach systems disclosed herein can have many different applications. In some embodiments, the systems can be configured as an atomic clock. For example, an atomic clock can be created by introducing a laser beam at two or more locations in the propagation chamber where the collimated atomic beam is propagating. A method of separated oscillatory fields can be used to interrogate an atomic transition. Atomic fluorescence can be collected to measure the effect of the oscillating field. The fluorescence signal can be used to stabilize the oscillator driving the oscillatory field.

In some embodiments, the system can be configured as an atom interferometer. For example, an atom interferometer can be created by introducing three or more laser beams to the propagation chamber wherein the collimated atomic beam is propagating. The three laser beams can be used to realize a Mach-Zehnder atom interferometer. The atomic fluorescence can be collected to measure the atomic state near the end of the propagation chamber. The atomic state can be inferred from the collected data.

The following described an exemplary process that can be used to manufacture an the atomic beam systems disclosed herein. Silicon and glass wafers can be etched or machined to form appropriate cavities for atom sourcing, collimation, and atom beam propagation. The silicon and glass layers can be anodically bonded together (except for one final layer). An atomic vapor source (e.g., Rb pill), and pumps (e.g., non-evaporable getters and graphite rods) can be inserted. The system can be placed on a heated stage in a vacuum chamber with the full stack of components and one unbonded interface. The system can be heated to near 100° C. to drive residual gases from components. The non-evaporable getter pumps can be thermally activated. The final layer can be bonded to the other layers. The system can be removed from the vacuum chamber. Finally, the atomic vapor source chamber can be heated, e.g., to 100° C. and the atomic vapor source can be laser activated (temperature, e.g., ~ 400-700° C.) to achieve high fractional absorption in the atom source region.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way.

What is claimed is:

1. An atomic beam system disposed in a chip or a chip-scale substrate comprising:

an atomic vapor source chamber disposed in the chip or a chip-scale substrate and configured to emit an atomic vapor comprising atoms used to generate a thermal atomic beam from the atomic vapor;

channels disposed in the chip or a chip-scale substrate and having lengths defined from first ends to second ends, the first ends in fluid communication with the atomic vapor source chamber, the channels having an orientation configured to generate a desired atomic flux and configured to passively collimate the atomic vapor as it moves through the lengths of the channels and generating the thermal atomic beam;

a propagation chamber disposed in the chip or a chip-scale substrate and in fluid communication with the second ends of the channels, the propagation chamber configured to have an internal pressure less than an internal pressure of the atomic vapor source chamber to enable the thermal atomic beam to freely propagate through the propagation chamber; and one or more passive pumps selected from a group consisting of one or more non-evaporable getter pumps, one or more pumps comprising graphite, and a combination thereof, the one or more pumps configured to cause the internal pressure of the propagation chamber to be less than the internal pressure of the atomic vapor source chamber;

wherein:

the atomic beam system is configured to enable the thermal atomic beam to be interrogated in free propagation; and the passive collimation of the atomic vapor is based, at least in part, by one or more properties of the channels.

2. The atomic beam system of claim 1, wherein the atomic vapor source chamber comprises an atomic vapor source configured to emit the atomic vapor;

wherein the atoms comprise alkali atoms, alkali earth atoms, or molecules thereof.

3. The atomic beam system of claim 2, wherein the atomic vapor source comprises Rubidium.

4. The atomic beam system of claim 1, wherein the atomic vapor source is configured to emit the atomic vapor when thermally or optically stimulated.

5. The atomic beam system of claim 1, wherein the system comprises a stack of one or more layers bonded together.

6. The atomic beam system of claim 5, wherein the stack comprises at least one silicon layer bonded to at least one glass layer.

7. The atomic beam system of claim 6, wherein the channels are formed into the at least one silicon layer.

8. The atomic beam system of claim 1, wherein the channels have an aspect ratio of between 1:1 and 1:100,000.

9. A method of generating a thermal atomic beam with an atomic beam system disposed in a chip or a chip-scale substrate comprising:

stimulating an atomic vapor source comprising alkali atoms, alkali earth atoms, or molecules thereof to emit an atomic vapor in a first chamber having a first internal pressure;

passively collimating the atomic vapor in an array of channels to generate the thermal atomic beam;

interrogating the thermal atomic beam in free propagation in a second chamber having a second internal pressure; and creating a pressure differential between the first and second chambers, the second chamber having a second internal pressure less than the first internal pressure;

wherein:

the creating comprises using one or more passive pumps configured to, at least in part, create the pressure differential between the first and second chambers; and the one or more pumps are selected from a group consisting of one or more non-evaporable getter pumps, one or more pumps comprising graphite, and a combination thereof.

10. The method of claim 9, wherein the channels are parallel to each other.

11. The method of claim 9, wherein the stimulating is thermally stimulating or optically stimulating.

12. The method of claim 9, wherein the array of channels have an aspect ratio of between 1:1 and 1:100,000.

13. The method of claim 9, wherein internal volumes of the first and second chambers, and the array of channels, are hermetically sealed.

14. An atomic beam system disposed in a chip or a chip-scale substrate comprising:

an atomic vapor source chamber configured to emit an atomic vapor comprising atoms used to generate a thermal atomic beam from the atomic vapor;

channels having lengths defined from first ends to second ends, the first ends in fluid communication with the atomic vapor source chamber, the channels configured to passively collimate the atomic vapor as it moves through the lengths of the channels and generating the thermal atomic beam;

a propagation chamber in fluid communication with the second ends of the channels, the propagation chamber configured to have an internal pressure less than an internal pressure of the atomic vapor source chamber to enable the thermal atomic beam to freely propagate through the propagation chamber; and one or more pumps configured to cause the internal pressure of the propagation chamber to be less than the internal pressure of the atomic vapor source chamber;

wherein:

the atomic beam system is configured to enable the thermal atomic beam to be interrogated in free propagation;

the passive collimation of the atomic vapor is based, at least in part, by one or more properties of the channels; and the one or more pumps are selected from a group consisting of one or more passive non-evaporable getter pumps, one or more passive pumps comprising graphite, and a combination thereof.

15. A method comprising:

stimulating an atomic vapor source to emit an atomic vapor in a first chamber of an atomic beam system disposed in a chip or a chip-scale substrate, the first chamber having a first internal pressure;

passively collimating the atomic vapor in an array of channels of the atomic beam system to generate a thermal atomic beam;

interrogating the thermal atomic beam in free propagation in a second chamber of the atomic beam system; and inducing a pressure differential between the first and second chambers, the second chamber having a second internal pressure less than the first internal pressure;

wherein:

the inducing comprises using one or more passive pumps configured to, at least in part, induce the pressure differential between the first and second chambers; and the one or more pumps are selected from a group consisting of one or more passive non-evaporable getter pumps, one or more passive pumps comprising graphite, and a combination thereof.

* * * * *